(12) United States Patent
Bonissone et al.

(10) Patent No.: US 7,725,293 B2
(45) Date of Patent: May 25, 2010

(54) SYSTEM AND METHOD FOR EQUIPMENT REMAINING LIFE ESTIMATION

(75) Inventors: Piero Patrone Bonissone, Schenectady, NY (US); Feng Xue, Clifton Park, NY (US); Anil Varma, Clifton Park, NY (US); Kai Frank Goebel, Mountain View, CA (US); Weizhong Yan, Clifton Park, NY (US); Neil Holger White Eklund, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 345 days.

(21) Appl. No.: 11/608,058

(22) Filed: Dec. 7, 2006

(65) Prior Publication Data

US 2008/0140361 A1    Jun. 12, 2008

(51) Int. Cl.
  *G06F 3/00* (2006.01)
(52) U.S. Cl. .................... 702/183; 702/179; 702/180; 702/182
(58) Field of Classification Search ............... 702/113, 702/117, 178, 182, 184, 185, 179, 180, 183; 324/727; 700/99; 704/245; 706/45
See application file for complete search history.

(56) References Cited

U.S. PATENT DOCUMENTS

| | | | |
|---|---|---|---|
| 4,336,595 A | 6/1982 | Adams et al. | |
| 4,719,587 A | 1/1988 | Berte | |
| 6,567,752 B2 * | 5/2003 | Cusumano et al. | ............ 702/34 |
| 6,847,854 B2 * | 1/2005 | Discenzo | ............ 700/99 |
| 7,103,509 B2 | 9/2006 | Shah et al. | |
| 7,181,364 B2 | 2/2007 | Lancaster et al. | |
| 2002/0019826 A1 | 2/2002 | Tan | |
| 2003/0158803 A1 | 8/2003 | Darken et al. | |
| 2003/0184307 A1 * | 10/2003 | Kozlowski et al. | ............ 324/427 |
| 2003/0187701 A1 | 10/2003 | Bonissone et al. | |
| 2003/0187702 A1 | 10/2003 | Bonissone et al. | |
| 2004/0210545 A1 | 10/2004 | Branke et al. | |
| 2006/0247798 A1 | 11/2006 | Subbu et al. | |
| 2007/0061232 A1 * | 3/2007 | Bonissone et al. | ........ 705/36 R |
| 2007/0088550 A1 * | 4/2007 | Filev et al. | ............ 704/245 |

OTHER PUBLICATIONS

Bonissone Piero, The Life Cycle of a Fuzzy Knowledge-based Classifier, 2003, IEEE, General Electric Global Research Center, pp. 488-494.*

Bonissone et al., Predicting the Best Units within a Fleet: Prognostic Capabilities Enabled by Peer Learning, Fuzzy Similarity, and Evolutionary Design Process, General Electric Global Research, pp. 312-318, © 2005.*

(Continued)

*Primary Examiner*—Eliseo Ramos Feliciano
*Assistant Examiner*—Felix E Suarez
(74) *Attorney, Agent, or Firm*—Scott J. Asmus (57) ABSTRACT

A method to predict remaining life of a target is disclosed. The method includes receiving information regarding a behavior of the target, and identifying from a database at least one piece of equipment having similarities to the target. The method further includes retrieving from the database data prior to an end of the equipment useful life, the data having a relationship to the behavior, evaluating a similarity of the relationship, predicting the remaining life of the target based upon the similarity, and generating a signal corresponding to the predicted remaining equipment life.

28 Claims, 6 Drawing Sheets

OTHER PUBLICATIONS

Piero Patrone Bonissone, "Method and System for Forecasting Reliability of Assets", U.S. Appl. No. 11/216,940, filed Aug. 31, 2005 with the U.S. Patent & Trademark Office.

P. Bonissone et al., "Design of local fuzzy models using evolutionary algorithms," Computational Statistics and Data Analysis, 51, 2006, pp. 398-416.

K. Aggour et al., "Automating the Underwriting of Insurance Applications," AI Magazine, 27, Fall 2006, pp. 36-50.

A. Patterson et al., "Six Sigma Quality Applied Throughout the Lifecycle of an Automated Decision System," Journal of Quality and Reliability Engineering International, Apr. 21, 2005, pp. 275-292.

K. Aggour et al., "SOFT-CBR: A self optimizing fuzzy tool for case-based reasoning," Proc. 5th Int. Conference on Case-Based Reasoning (ICCBR) 2003, Lecture Notes in Artificial Intelligence, Trondheim, Norway, 2003, pp. 5-19.

P. Bonissone et al., "Evolutionary Optimization of Fuzzy Decision Systems for Automated Insurance Underwriting," Proc. FUZZ-IEEE 2002, Honolulu, HI, May 2002, pp. 1003-1008.

P. Bonissone et al., "An Evolutionary Process for Designing and Maintaining a Fuzzy Instance-based Model (FIM)," Proc. First workshop of Genetic Fuzzy Systems (GFS 2005), Granada Spain, Mar. 17-19.

K. Aggour et al., "Selecting the Best Units in a Fleet: Prediction from Equipment Peers," Proc. 7th Int. Conference on Case-Based Reasoning (ICCBR) 2005, Chicago, IL, Aug. 23-26.

K.F. Gobel et al., "System and Method for Equipment Life Estimation," U.S. Appl. No. 11/608,076, filed Dec. 7, 2006, GE.

* cited by examiner

SYSTEM AND METHOD FOR EQUIPMENT REMAINING LIFE ESTIMATION

BACKGROUND OF THE INVENTION

The present disclosure relates generally to remaining useful life prediction in prognosis, and particularly to equipment subsystem remaining useful life (RUL) prediction.

Estimating the remaining life of a subsystem is known in the art as prognostics. RUL estimates provide valuable information for operation of modern complex equipment. RUL estimates provide decision making aids that allow operators to change operational characteristics (such as load) which, in turn, may prolong the life of the subsystem. RUL estimates also allow planners to account for upcoming maintenance and set in motion a logistics process that supports a smooth transition from faulted to fully functioning equipment. Predicting remaining life is not straightforward because, ordinarily, remaining life is conditional on future usage conditions, such as load and speed, for example. Examples of equipment that may benefit from the use of remaining life estimates are aircraft engines (both military and commercial), medical equipment, and power plants, for example.

A common approach to prognostics is to employ a model of damage propagation contingent on future use. Such a model is often times based on detailed materials knowledge and makes use of finite element modeling. Because such models are extremely costly to develop, they must be limited to a few important parts of a system, but are rarely applied to subsystems. This approach is often called "lifting".

Another approach is a data-driven approach to take advantage of time series data where equipment behavior has been tracked via sensor outputs during normal operation all the way to an end of equipment useful life. The end of equipment useful life may represent a totally non-functioning state of the equipment, for example, equipment failure. The end of equipment useful life can also represent a state of the equipment wherein the equipment no longer provides expected results. Alternatively, the end of useful life may be defined as when the equipment reaches a condition of imminent failure. When a reasonably-sized set of these observations exists, pattern recognition algorithms can be employed to recognize these trends and predict remaining life. These predictions are often made under the assumption of near-constant future load conditions. However, such run-to-end-of-equipment-useful-life data are often not available because, when the observed system is complex, expensive, and, safety is important, such as aircraft engines, for example, faults will be repaired before they lead to the end of equipment useful life. This deprives the data driven approach from information necessary for its proper application.

Another approach is a peer-based approach that utilizes information about other equipment to forecast the reliability of equipment within a fleet for the purpose of equipment selection to improve mission reliability. This approach typically focuses on the overall platform, such as a locomotive, or an aircraft, for example, without providing any prognostic insight regarding the components or sub-components of the platform. Furthermore, this approach assumes, in the ideal case, the availability of operational, maintenance, and environmental data for each platform. However, this information may not always be available.

Accordingly, there is a need in the art for a life estimation arrangement that overcomes these drawbacks.

BRIEF DESCRIPTION OF THE INVENTION

An embodiment of the invention includes a method to predict remaining life of a target. The method includes receiving information regarding a behavior of the target, and identifying from a database at least one piece of equipment having similarities to the target. The method further includes retrieving from the database data prior to an end of the equipment useful life, the data having a relationship to the behavior, evaluating a similarity of the relationship, predicting the remaining life of the target based upon the similarity, and generating a signal corresponding to the predicted remaining equipment life.

Another embodiment of the invention includes a system to predict remaining life of a target. The system includes a database comprising data for equipment, a processor in signal communication with the database, and a computational model application for executing on the processor, the computational model performing a method. The method includes receiving information regarding a behavior of the target, and identifying from the database at least one piece of equipment having similarities to the target. The method further includes retrieving from the database data prior to an end of the identified equipment useful life, the data having a relationship to the behavior, evaluating a similarity of the relationship, and predicting the remaining life of the target based upon the similarity. The processor is responsive to the computational model application to generate a signal corresponding to the predicted remaining equipment life.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention will provide a peer-based approach that requires only operational data about other equipment to provide a remaining useful life forecast for a target piece of equipment, also herein referred to as a probe. An embodiment of the invention will provide a subsystem level prognostics approach over an entire subsystem without needing to assess the particular damage propagation mechanics. In an embodiment, the approach will operate in the absence of run-to-end-of-equipment-useful-life data.

In an embodiment of the invention, operational data from a plurality related equipment are collected and stored for monitoring and analysis purposes. Further, preliminary RUL estimates of the related equipment are collected from a variety of sources. In an embodiment, a fusion of a plurality of preliminary RUL estimates for at least one peer, or piece of related equipment having exhibited similar operational behavior to the probe, will be used to develop a Fuzzy Instance Model (FIM) to provide a preliminary RUL estimate of the target.

In an embodiment, these operational data represent the starting point of the preliminary RUL estimate of the probe. An embodiment of the invention uses local fuzzy models, which are related to both kernel regressions and locally weighted learning, to determine the remaining life of the probe. In an embodiment, the probe is a turbine engine. In an embodiment, the local fuzzy model is based on clusters of peers, or similar equipment with comparable operational characteristics and performance. In an embodiment, use of the local fuzzy model is distinguished from the development of individual models that are based only on the history of each engine, or the development of a global model that is based on the collective history of all the engines. An embodiment will include the combination of the fuzzy peer-based approach for performance modeling with an evolutionary framework for model maintenance. The evolutionary framework includes generating a collection of competing models, evaluating their performance in light of the currently available data, refining the best models using evolutionary search, and selecting the best model after a finite number of iterations. In an embodiment, the evolutionary framework is repeated to automatically update and improve the fuzzy model. In an embodiment, the best model at the end of the evolutionary process is used at run time to estimate RUL of the probe engine or engine subsystem.

As used herein, the term prognostics shall refer to the estimation of remaining useful subsystem life. The remaining useful life (RUL) estimates are in units of time or cycles of operation such as startup, flight, and shutdown of an aircraft engine, for example. The time estimate typically has associated uncertainty that is described as a probability density curve. Operators can choose a confidence level that allows them to incorporate a risk level into their decision making. Typically, the confidence interval on RUL estimates decreases as the prediction horizon decreases, such as near the end of component life, for example.

Prognostics is closely linked with diagnostics. As used herein, the term diagnostics shall refer to the detection of a fault condition, or an observed change in an operational state that is in related to a verifiable event. Faults are the first sign of a potential end of equipment useful life at some future time. An example of such a fault is an increase in engine fuel consumption resulting from a cracked turbine blade. The direct cost of the end of equipment useful life is unavoidable: ultimately, the component must be replaced. Moreover, there are indirect costs to the end of equipment useful life that are in many cases far greater than the cost of the repair. One source of indirect costs is secondary damage, for example, the end of the useful life of a component in the compressor stage of a gas turbine often causes damage to the rear stages. Another indirect cost is unscheduled maintenance. It is often less expensive to replace a faulty component during scheduled maintenance before it has reached the end of its useful life than to have a component reach the end of its useful life in the field and have to shut the whole system down.

In the absence of any evidence of damage or a faulted condition, prognostics reverts to statistical estimation of fleet-wide life, such as Weibull curves or other suitable mechanisms. It is more common to employ prognostics in the presence of an indication of abnormal wear, faults, or other non-normal situation. It is therefore important to include accurate and responsive diagnostics to provide a trigger point for the prognostic algorithms to operate.

Condition-based prediction systems depend on reliable fault diagnostics to initiate the prognostic algorithms. If diagnostics recognizes the start point of damage too late, the damage propagation models may lag reality and underestimate the damage. If prognostic algorithms are kicked off when there is no real damage, the benefit of a remaining life estimate is reduced. Accordingly, presence of an accurate diagnostic fault detection algorithm will be assumed as a basis for an embodiment of a prognostic RUL prediction.

Figure 1:
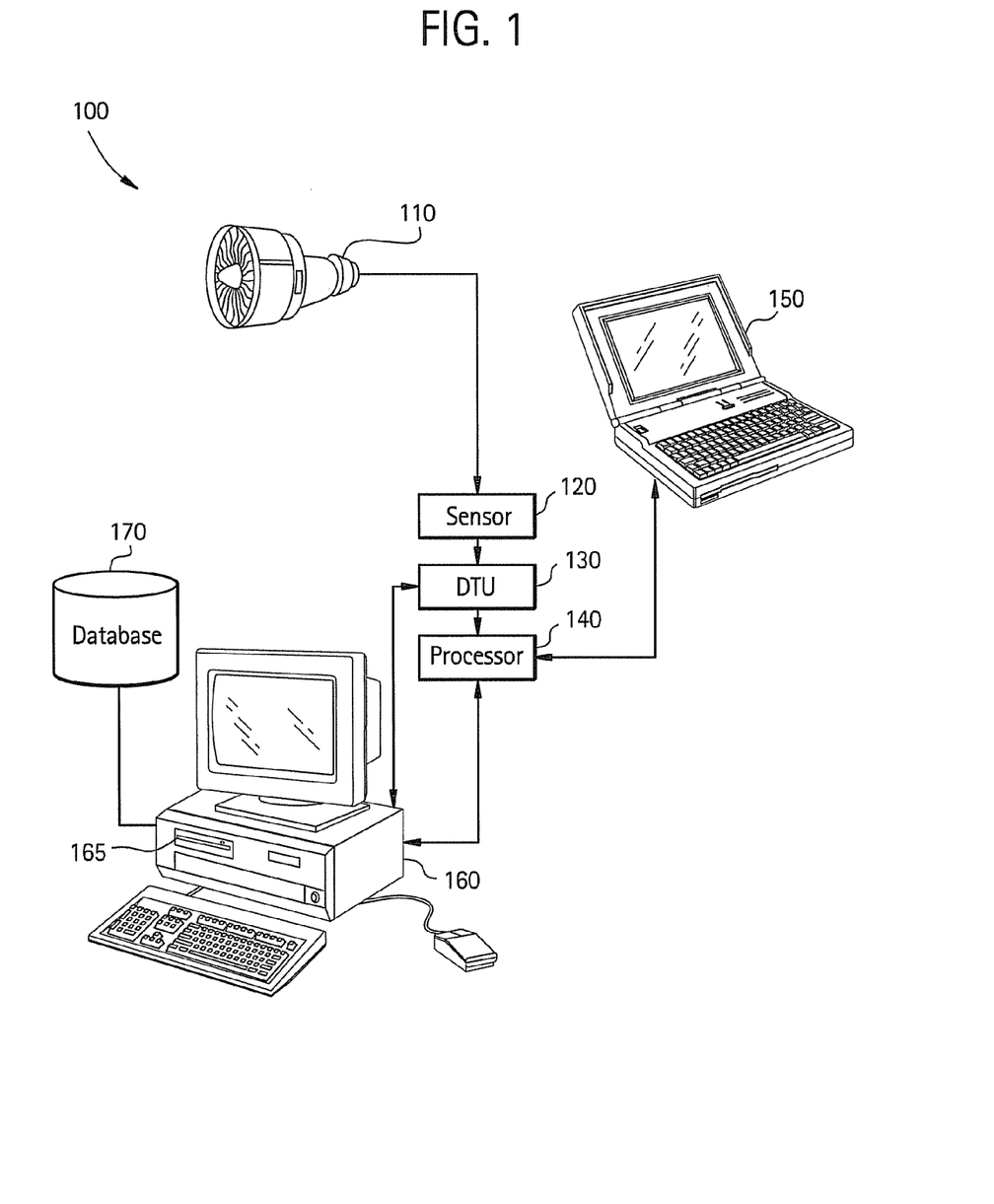
FIG. 1 depicts a schematic diagram of a prediction system in accordance with an embodiment of the invention.

Referring now to FIG. 1, a schematic diagram of an embodiment of a peer based prediction system 100 is depicted. In an embodiment, the prediction system includes at least one turbine engine 110, at least one actual sensor 120, a data transfer unit (DTU) 130, a processor 140, an interface unit 150, a computer 160, and a database 170. The computer 160 further includes a program storage device 165.

While an embodiment of the system has been described having at least one turbine engine, it will be appreciated that the scope of the invention is not so limited, and that the invention will also apply to prediction systems 100 including other pieces of equipment, such as locomotive engines, power generators, medical equipment, and rolling mills, for example.

In an embodiment, the at least one sensor 120 is disposed and configured to be responsive to an operating condition of the engine 110, and to generate a signal representative of the operating condition of the engine 110. In an embodiment, the at least one sensor 120 is in signal communication with the data transfer unit 130, which makes available to the processor 140 the signal representative of the operating condition of the engine 110.

In an embodiment, the processor 140 is in signal communication with an interface device 150, such as to allow for an on-line monitoring process, as will be described further below. In an embodiment, the processor 140 is also in signal communication with the computer 160. In an embodiment, the computer 160 is in signal communication with the database 170. In an embodiment, the computer 160 is configured to make available to the database 170, via the processor 140, the data relating to the operating conditions of the engine 110. In an embodiment, the database 170 is further configured to store and make available to the computer 160 the data relating to the operating conditions of the at least one engine 110, including the signals generated by the at least one sensor 120. The computer 160 also includes the program storage device 165 configured to store, and make available to the computer 160 for execution, a computational model for estimating the RUL of the probe. The processor 140 is responsive to the computational model application to generate a signal corresponding to the predicted remaining engine 110 life. It will be appreciated that the above is for illustration purposes only, and not for limitation of an embodiment of the invention.

While an embodiment of the invention has been described having a computer 160 in signal communication with the processor 140, it will be appreciated that the scope of the invention is not so limited, and that the invention will also apply to prediction systems that have the computer 160 in direct signal communication with the data transfer unit 130. It will be further appreciated that an embodiment of the invention will also include the computer in signal communication via the data transfer unit 130 via a variety of communication protocols, such as cellular, wireless internet, and others, for example, to allow an connection between the computer and the data transfer unit during use of the equipment, to enable a remote, on-line estimating process.

As used herein, instance-based reasoning (IBR) is used to describe a collection of previously experienced data that can be kept in their raw representation. IBR is distinguished from case-based reasoning (CBR), in which the data requires refinement, abstraction, and organization into cases. Like CBR, IBR is an analogical approach to reasoning, because it relies upon finding previous instances of similar operational behavior, and uses the data relating to the previous instances to create an ensemble of local models. Accordingly, the process to define the similarity is an important part of the performance of IBR models. It will be appreciated that similarity is a dynamic concept and will change over the use of the IBR model. In an embodiment, learning methodologies are employed to define and adapt the IBR model. Furthermore, the concept of similarity is not crisply defined, creating the need to allow for some degree of fuzziness in its evaluation. In an embodiment, evolving the design of a similarity function in conjunction with the design of the attribute space in which the similarity is evaluated will address the dynamic nature of the evaluation of similarity.

In an embodiment, the computational model, executing on the computer 160 of the prediction system 100 will predict the remaining life of the probe engine based on the following four steps, each of which will be described in turn, in further detail below. First, retrieval of operational data of peer equipment, also herein referred to as equipment, from the database 170, the peer equipment having similarities to observed operational behavior of the probe. Second, evaluation of a similarity measure between the operational data of the probe and the retrieved operational data of the peer equipment. Third, creation of local models using the most similar peers, including a weighting value derived according to the similarity measures. Fourth, aggregation of outputs of the local models to estimate the RUL of the probe engine.

Figure 2:
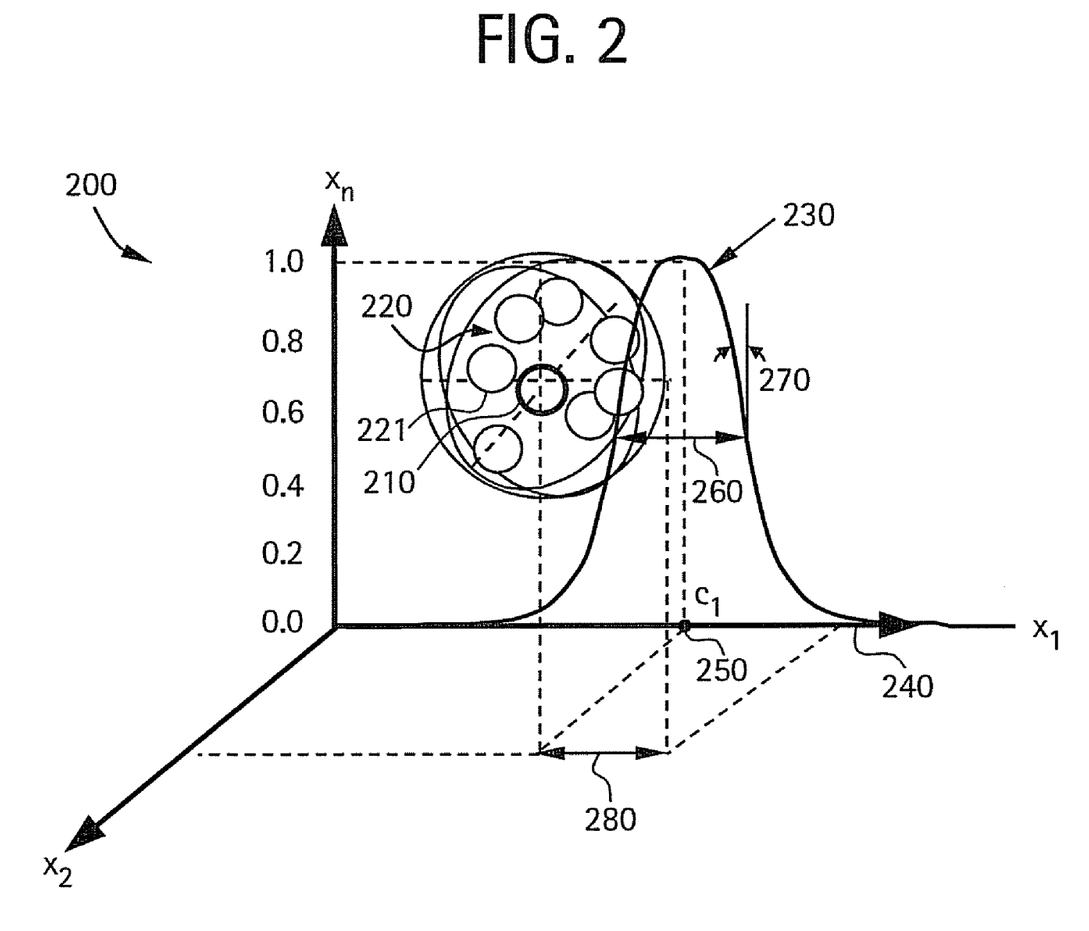
FIG. 2 depicts a chart including a probe and peer equipment as spheres of data in accordance with an embodiment of the invention.

Retrieval of the data of peer equipment: Referring now to FIG. 2, a chart 200 depicts the probe 210 and a plurality of potential peer 220 equipment as spheres of data within a three dimensional space. In an embodiment, the retrieval step includes observing an operational behavior of the probe 210, and identifying at least one piece of peer 221 equipment that has a similarity to the behavior of the probe 210. In an embodiment, the plurality of potential peer 220 equipment can be considered to be points in an n-dimensional attribute space. For example, consider that the probe Q 210 has an associated n-dimensional vector of values x for each of n potential operational attributes, as shown by Equation-1.

$$Q=[x_{1,Q}, x_{2,Q}, \ldots, x_{n,Q}] \quad \text{Equation-1}$$

A similar n-dimensional vector characterizes each of the potential peers $u_j$ 220 in the fleet with an attribute vector of values of x for each of n potential operational attributes of the peer $u_j$ 221 stored within the database 170 is shown by Equation-2.

$$u_j=[x_{1,j}, x_{2,j}, \ldots, x_{n,j}] \quad \text{Equation-2}$$

As used herein, the reference numeral 220 shall be used to indicate a grouping of peers, or peers in general, while the reference numeral 221 shall be used to indicate a single peer of interest. For each operational attribute of the probe Q 210, denoted by a subscript dimension i, a Truncated Generalized Bell Function, $TGBF_i(x_i; a_i, b_i, c_i)$ 230 is applied to define a range of the values of the attribute vector of x to include the potential peer 221 of the plurality of potential peers 220. That is, the $TGBF_i$ 230 shall be used to determine if the potential peer 221 is similar to the probe 210. In an embodiment, $TGBF_i$ 230 will be positioned along an axis 240 that denotes an independent variable value. In an embodiment, the $TGBF_i$ 230 will be centered at a value $c_i$ 250 equal to an independent variable value $x_i$ of the probe 210, along the axis 240. In an embodiment, the $TGBF_i$ represents the degree of similarity for the ith attribute, of the n potential attributes, along the ith independent axis. This is shown specifically in Equation-3, where $a_i$ is a width parameter, $b_i$ is a slope parameter, and $\epsilon$ is a truncation parameter. In an embodiment the truncation parameter $\epsilon = 10^{-5}$.

$$TGBF_i(x_i; a_i, b_i, c_i) = \begin{cases} \left[1 + \left|\frac{x_i - c_i}{a_i}\right|^{2b_i}\right]^{-1} & \text{if} \left[1 + \left|\frac{x_i - c_i}{a_i}\right|^{2b_i}\right]^{-1} > \epsilon \\ 0 & \text{otherwise} \end{cases} \quad \text{Equation-3}$$

In an embodiment, the parameter $c_i$ 250 in each $TGBF_i$ 230, for each of n attributes is equal to the value of that attribute of the probe Q 210. Accordingly, each $TGBF_i$ 230 has two free parameters, the width parameter, $a_i$ 260 to control the spread of the $TGBF_i$ 230, and the slope parameter, $b_i$ 270 to control curvature of the $TGBF_i$ 230. In a coarse retrieval step, the peer 221 is retrieved from the database 170 if each operational attribute of the peer 221 is within the support, or between the axis 240 that denotes the independent variable and the $TGBF_i$ 230 of each operational attribute of the probe 210.

In an embodiment, the retrieval step is formalized as follows. $R_i$ 280 is defined as half of the support of the $TGBF_i$ 230, centered on the probe's coordinate $x_{i,Q}$, or $c_i$ 250. N(Q) is a neighborhood of Q, and defined by the constraint $|x_{i,Q}-x_{i,j}|<R_i$ where $x_{i,Q}$ represents the value along the independent variable axis 240 of the probe 210, and $x_{i,j}$ represents the value along the independent variable axis 240 of the peer 221 for each operational attribute i. P(Q), the set of potential peers 221 of the probe Q 210 to be retrieved from the database, is therefore defined by all peers 221 within the range N(Q) from the value of Q: $P(Q)=\{u_j, j=1, \ldots, m | u_j \in N(Q)\}$.

While an embodiment of the invention has been depicted in FIG. 2 as retrieving potential peers with respect to one operational attribute in a three-dimensional space, depicted by the independent axis 240 labeled as $x_1$, it will be appreciated that the scope of the invention is not so limited, and that the invention will also apply to retrieving potential peers with respect to more than one operational attribute, such as two, three, four, five, or more operational attributes, for example. While an embodiment of the invention has been depicted having two operational attributes in a three dimensional space, it will be appreciated that the scope of the invention is not so limited, and that the invention will also apply to peer based prediction systems that may utilize more than two operational attributes in a space having more than three dimensions, such as four, five, six, or more dimensions, for example. Further, while an embodiment has been shown having one TGBF with a set of parameters values $a_i, b_i$ to retrieve potential peers with respect to a particular attribute, it will be appreciated that the scope of the invention is not so limited, and that the invention will also apply to peer prediction systems that use more than one TGBF, each TGBF defined with respect to a particular operational attribute i, and including an independent set of parameter values $a_i, b_i$ to retrieve potential peers with respect to each particular operational attribute.

Figure 3:
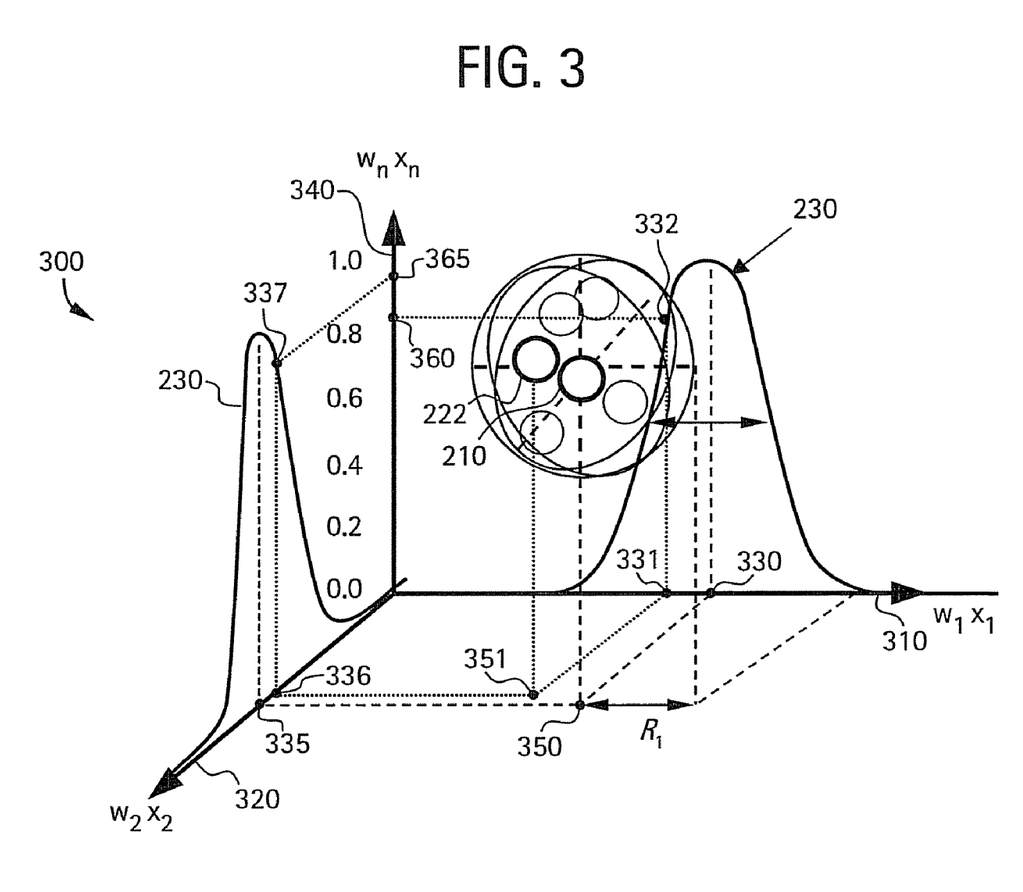
FIG. 3 depicts another chart including a probe and peer equipment as spheres of data in accordance with an embodiment of the invention.

Evaluation of a similarity measure: Referring now to FIG. 3, a chart 300 depicts the probe 210 and a similar peer 222 equipment as spheres of data within a three dimensional space. An embodiment of the invention includes evaluating the similarity of the retrieved data of the similar peer 222 equipment. In an embodiment, each $TGBF_i$ 230 is a membership function representing the degree of satisfaction of each attribute, i of the constraint $|x_{i,Q}-x_{i,j}|<R_i$. It will be appreciated that chart 300 in FIG. 3 includes two axes 310, 320 that each depict an independent variable value that has a value equal to an independent variable value of each of two attributes of the probe $x_{i,Q}$ 330, 335 and represent the degree of similarity along that dimension of the n potential operational attributes. That is, each $TGBF_i$ 230 measures the closeness of the similar peer 222 around the probe value $x_{i,Q}$ 330, 335 along the ith attribute, or independent axes 310, 320.

In an embodiment, a similarity coefficient $S_{i,j}$ of the relationship between the similar peer $u_j$ 222 and the probe 210 is evaluated via application of Equation-4 where $x_{i,Q}$ represents a value of an attribute of the probe, and $x_{i,j}$ represents a value of the attribute of the similar peer 222.

$$S_{i,j} = TGBF(x_{i,j}; a_i, b_i, x_{i,Q}) = \left\{\left[1 + \left|\frac{x_{i,Q} - x_{i,j}}{a_i}\right|^{2b_2}\right]^{-1}\right\}$$ Equation-4

In an embodiment, application of $TGBF(x_{i,j}; a_i, b_i, x_{i,Q})$ to each attribute will evaluate the similarity coefficient $S_{i,j}$ between the similar peer 222 and the probe Q 210 along each attribute i. FIG. 3 includes an axis 340 that depicts a dependent variable value along each attribute i. The TGBF 230 of each attribute i is centered on the value of that attribute of the probe 210, such that the value of the TGBF for each attribute i of the probe 210 is equal to 1 along the axis 340.

In an embodiment, determination of the $c_i$ 330, 335 for each TGBF is accomplished by projecting down to a point 350 onto a plane containing the two independent axes 310, 320 the location of the probe Q 210. That point 350 is then projected to the two corresponding probe 210 values $x_{i,Q}$ 330, 335 of the two independent axes 310, 320, which will become the center $c_i$ 330, 335 of each TGBF 230 of each attribute. In a similar fashion, the location of the similar peer 222 is projected down to a point 351 on the plane containing the two independent axes 310, 320. That point 351 is then projected to the two corresponding similar peer 222 values $x_{i,j}$ 331, 336 of the two independent axes 310, 320. Each of the peer $x_{i,j}$ 331, 336 values are projected to points 332, 337 of intersection with the respective TGBF 230. The points of intersection 332, 337 are then projected to the axis 340, to provide the corresponding similarity coefficient $S_{i,j}$. It will be appreciated that in an embodiment as depicted in FIG. 3, a similarity coefficient $S_{1,j}$ 360 has a value of approximately 0.8, and a similarity coefficient $S_{2,j}$ 365 has a value of approximately 0.9.

In an embodiment, it is desired that the most similar peers 220 be the closest to the probe 210 along all n attributes. Accordingly, wherein the data of the similar peer 222 has a plurality of attributes, and each attribute has the similarity coefficient $S_{i,j}$, a peer similarity coefficient, also herein referred to as an equipment similarity coefficient, $S_j$ is defined as the intersection, or a minimum of the plurality of similarity coefficients $S_{i,j}$, as shown in Equation-5.

$$S_j = \text{Min}_{i=1}^{n}\{S_{i,j}\} = \text{Min}_{i=1}^{n}\{TGBF(x_i; a_i, b_i, x_{i,Q})\}$$ Equation-5

Equation-5 implies that each attribute is equally important in computing similarity. In an embodiment, each attribute is considered to have a different relevance in the computation of the peer similarity coefficient $S_j$. Accordingly, a weighting value $w_i$ is applied to each attribute value $x_i$ and the peer similarity coefficient $S_j$ is extended using a weighted minimum operator, as shown in Equation 6, where $w_i \in [0,1]$.

$$S_j = \text{Min}_{i=1}^{n}\{\text{Max}[(1-w_i), S_{j,i}]\} = \text{Min}_{i=1}^{n}\{\text{Max}[(1-w_i), TGBF(x_i; a_i, b_i, x_{i,Q})]\}$$ Equation-6

The set of values for the weights $\{w_i\}$ and of the parameters $\{(a_i, b_i)\}$ are design choices that impact the proper selection of peers 220. In an embodiment a manual setting of these values is used. In another embodiment, use of an evolutionary search to determine and refine these values, as will be described further below, is used.

Creation of local models: In an embodiment, m peers $u_j$, 220 (j=1 ... m) are retrieved as similar to a given probe Q 210. Each similar peer $u_j$ 222 has the peer similarity coefficient $S_j$. In an embodiment, each similar peer $u_j$ 222 has an estimated RUL $y_j$. In an embodiment, the estimated RUL $y_j$ for each similar peer 222 is derived by at least one of: field observations leading to a distribution of remaining useful life; laboratory experiments measuring the wearing of the equipment; inspections of the equipment before major overhauls; statistical models that may be parametric or nonparametric, such as Weibull; and neural networks.

Aggregation of outputs: In an embodiment, individual RUL values $y_j$ of each similar peer 222 are combined to generate the predicted RUL $y_Q$ for the probe Q 210. In an embodiment, this aggregation is defined as a similarity weighted average. In an embodiment, the similarity weighted average is evaluated by computing the weighted average of individual RUL estimates $y_j$ of the similar peers 222 using their normalized similarity to the probe 210 as a weight, as shown in Equation-7, where j represents an index related to the peer, and, m represents the total number of peers included.

$$y_Q = \frac{\sum_{j=1}^{m} S_j \times y_j}{\sum_{j=1}^{m} S_j}$$ Equation-7

In an embodiment, a methodology to generate the best values of the weights $\{w_i\}$, and search parameters $\{(a_i, b_i)\}$ will enhance the accuracy of the RUL estimates. In an embodiment, the process of estimating RUL for one of the engine probe 210 and the engine component probe 210 includes an off-line training process and an on-line monitoring process.

In an embodiment, the off-line training process includes an evolutionary algorithm (EA) to tune and maintain parameters necessary to identify an optimal combination of values. In an embodiment, the parameters tuned by the EA include the width parameter, $a_i$ 260, the slope parameter, $b_i$ 270, and the weighting value $w_i$. In an embodiment, the EA includes a population of individuals, also known as chromosomes, each of which includes a vector of elements that represent the distinct tunable parameters within the FIM configuration. In an embodiment, the chromosome has the form shown in Equation-8.

$$[w_1 w_2 \ldots w_n][(a_1,b_1),(a_2,b_2),\ldots (a_n,b_n)]$$ Equation-8

In an embodiment, each chromosome defines the TGBF 230 of the peer 221 within the attribute space and the relevance of each attribute in evaluating similarity via specification of a vector of weights $[w_1, w_2, \ldots w_n]$. The second part of the chromosome, containing the vector of pairs $[(a_1,b_1), (a_2,b_2)\ldots(a_n,b_n)]$ defines the parameters of the TGBF 230 for the attribute retrieval and similarity evaluation. If $w_i \in \{0,1\}$, attribute selection is performed, that is, a crisp subset is selected from the universe of potential attributes. If $w_i \in [0,1]$ attribute weighting is performed, and a fuzzy subset of the universe of potential attributes is defined.

Figure 4:
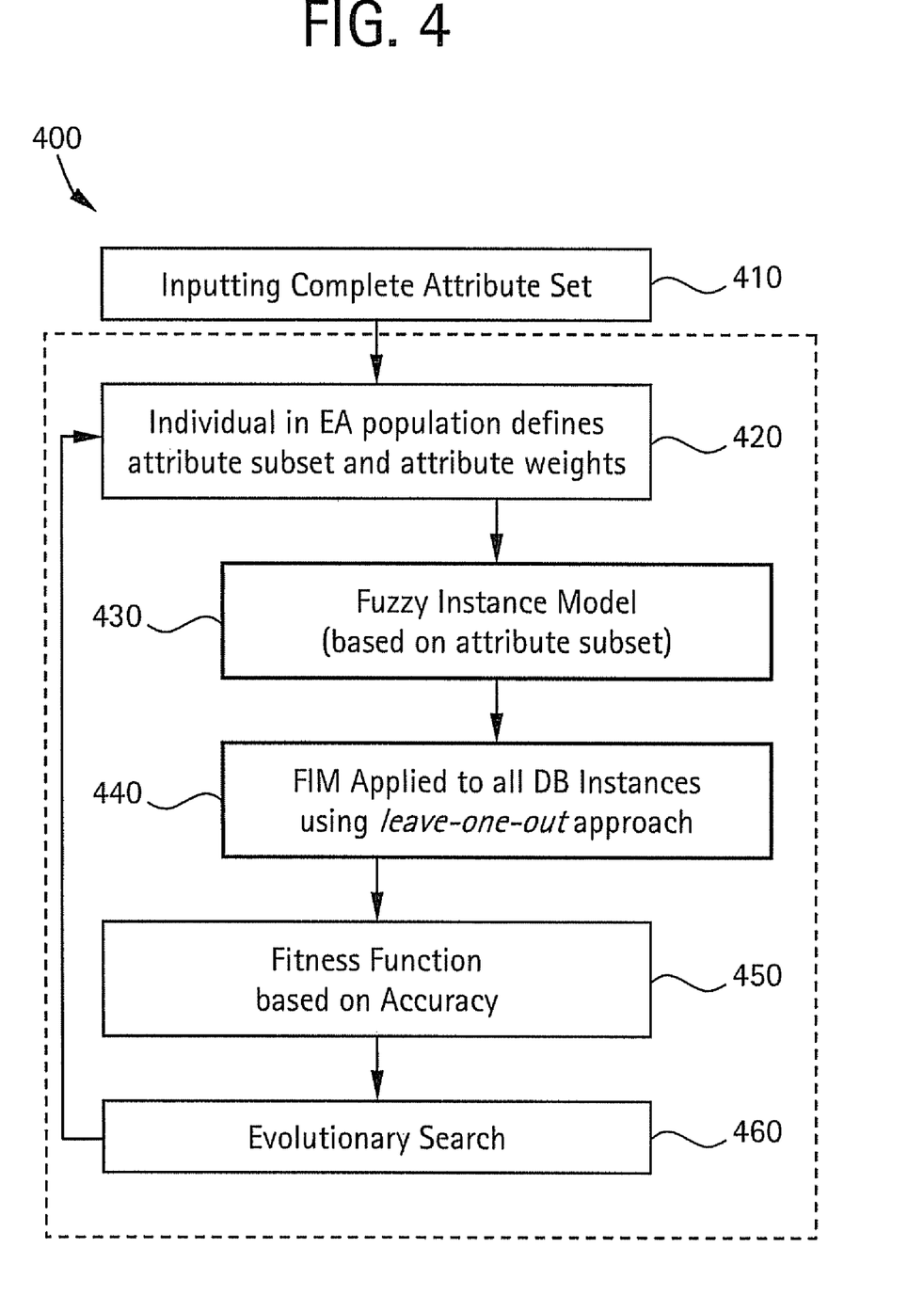
FIG. 4 depicts a flowchart of an evolutionary algorithm in accordance with an embodiment of the invention.

Referring now to FIG. 4, a flowchart 400 of an embodiment of the EA, known as a wrapper approach, or an optimization wrapper, is depicted. In an embodiment, the EA will compare, or test for accuracy, a sample model constructed with a sample chromosome against a known result. The EA will then adjust at least one of the weights and the attributes within the chromosome, retest, and monitor the effect on accuracy. In this way, the EA will search to find the optimum combination of weights and attributes within the chromosome to optimize the accuracy of the RUL prediction.

In an embodiment, the EA begins with inputting 410, or receiving the complete set of attribute parameters, or historical data regarding the behavior of the peer 221 equipment. The process continues with encoding the parameters of the historical data for the EA, or defining 420 a chromosome of a subset of the attribute parameters, including corresponding weight values. The method proceeds by building 430 the Fuzzy Instance Model (FIM), using the weights and attributes provided by the chromosome. The FIM is then applied 440 to all but one of the peers 220 stored within the database 170, to derive a predicted RUL, as disclosed herein. The method includes creating a performance metric, or fitness function f, and the predicted RUL ŷ is then tested 450, or compared with the fitness function f, to evaluate the accuracy of the constructed model against a known result. Because it is desired to generate the most accurate RUL estimate, the absolute value of the prediction error, or prediction accuracy, is used as the function to minimize, i.e.: $|y-\hat{y}|$. Since the fitness function is to be maximized, the fitness function of the negation of such error is used, i.e.: $f = -|y-\hat{y}|$. Subsequent to comparing the accuracy of the constructed model to the known result, the search continues 460 by defining 420 another chromosome of the subset of attribute parameters and repeating the process.

In an embodiment, the EA will be employed to maintain and refine the accuracy of the FIM. In an embodiment, the EA will adjust or tune attribute parameters $a_i$ 260 and $b_i$ 270 to alter the selection of potential peers 220 to optimize the fitness function. In an embodiment, the EA will be used to adjust or tune the weighting values $w_i$ to alter the effect of a given attribute of the similar peer 222 on the FIM and optimize the fitness function. In an embodiment, the method includes storing the tuned parameters as the historical data for future use. It will be appreciated that optimum selection of the parameters 260, 270 and weighting values is dynamic, and may change over time depending upon the behavior of the probe 210. Accordingly, in an embodiment, the EA will adjust the selection of at least one of the parameters 260, 270 and the weighting values in response to the operational behavior of the probe 210.

In an embodiment, the on-line monitoring process will execute the FIM in response to the detection of faults. In an embodiment, in response to the detection of at least one fault, the n-dimensional vector of values, as defined by Equation-1 above (and shown below for convenience), is derived to represent the attribute state of the probe subsequent to the fault detection.

$$Q = [x_{1,Q}, x_{2,Q}, \ldots, x_{n,Q}] \quad \text{Equation-1}$$

In an embodiment, specific diagnostic information, such as failure modes for example, can be incorporated in this attribute representation to improve the estimation performance. In embodiment, the fault modes of the probe Q 210 are used to specify retrieval of the probe 221 to include a similar fault mode. The foregoing disclosed process is then followed to provide the RUL estimate for the probe Q 210 based on the peers 220 in the database 170. In an embodiment, the n-dimensional vector of values described by Equation-1 for the probe 210, as well as those described by Equation-2 for the peers 220, are constantly updated with new operational data gathered. In an embodiment, RUL estimates are also updated with new operational data gathered from the probe Q 210. In an embodiment, in response to a fault detection and a RUL prediction, the peer based system 100 can advise of control action, such as to lower engine speed for example, to increase the RUL of the faulted probe Q 210.

Figure 5:
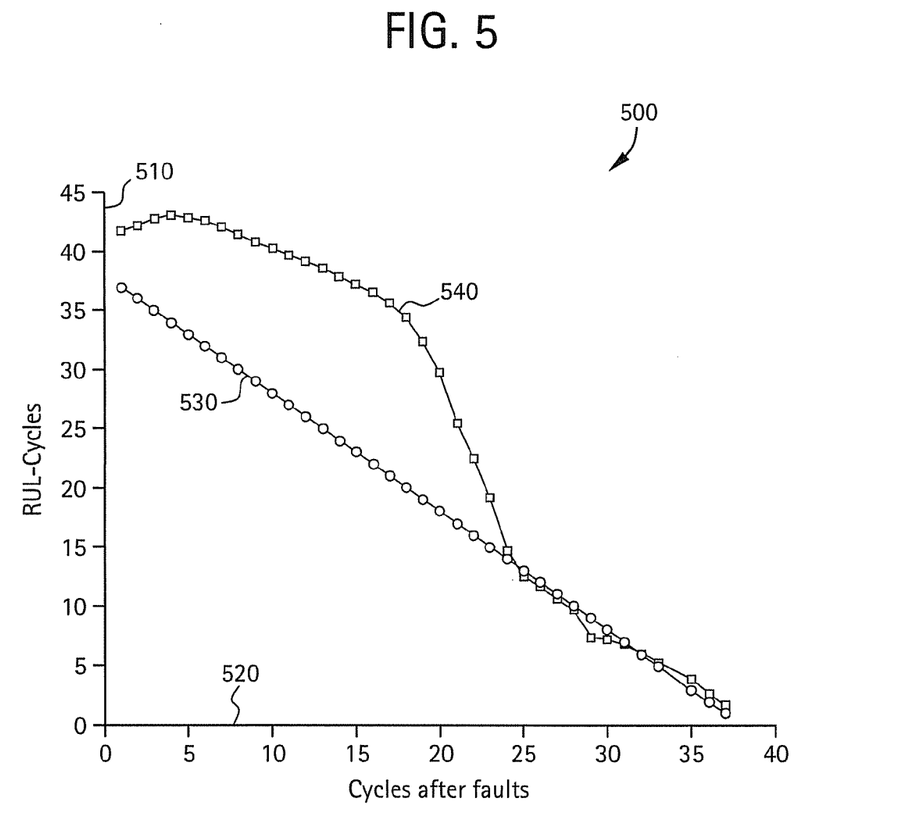
FIG. 5 depicts a chart with results from an experimental test of a method to predict remaining probe equipment life in accordance with an embodiment of the invention.

Referring now to FIG. 5, a chart 500 depicting results from an experimental test of an embodiment of the peer based system 100 for an aircraft engine is depicted. An axis 510 depicts the RUL in cycles, and another axis 520 depicts the number of cycles subsequent to detection of the fault. A line 530 represents the true number of cycles remaining, and a line 540 represents the predicted RUL as provided by the peer based prediction system 100 disclosed herein. It will be appreciated that the accuracy of the predicted RUL 540 increases as the FIM is updated with operational data from each additional cycle.

Figure 6:
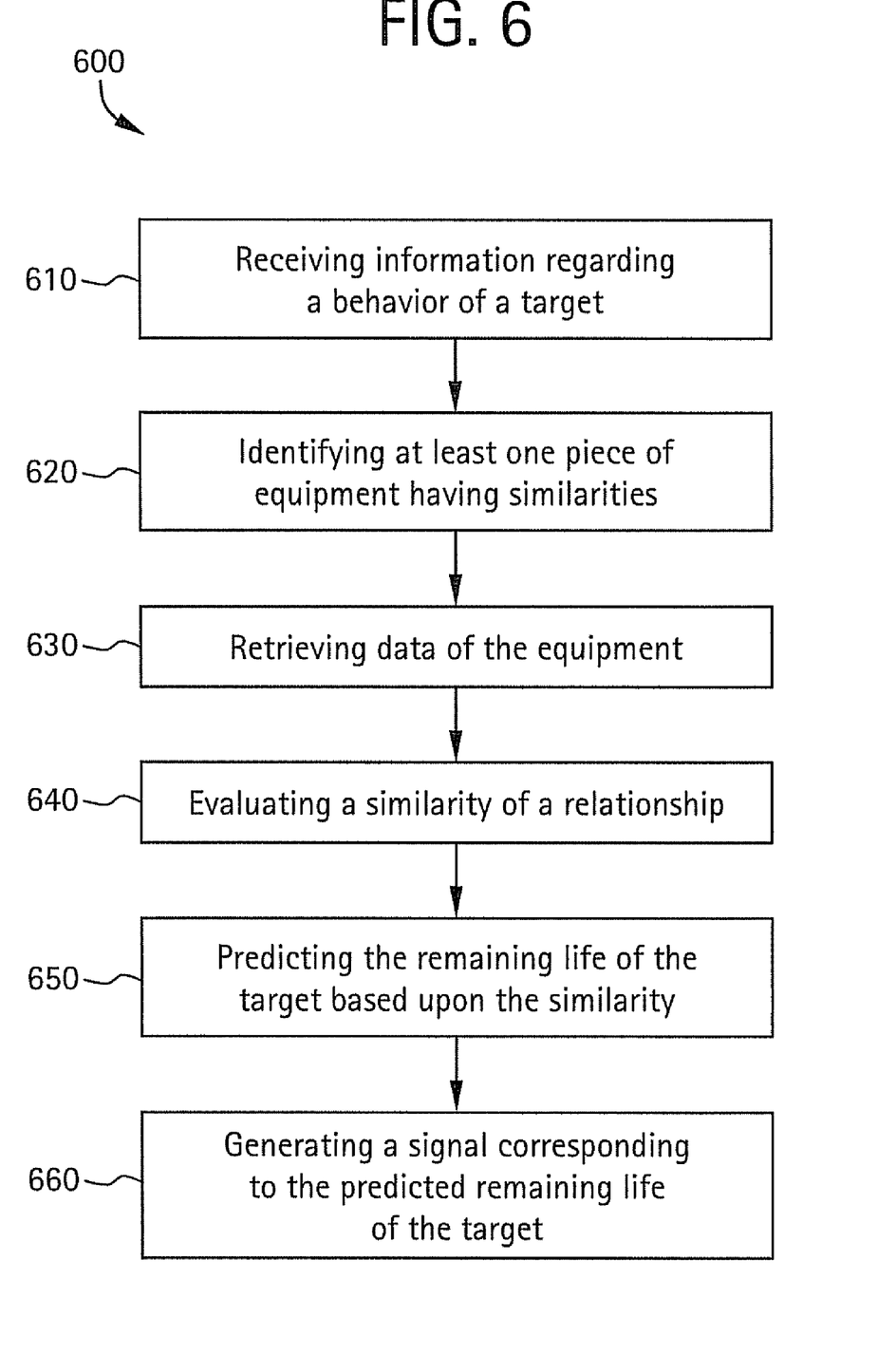
FIG. 6 depicts a flowchart of an exemplary method of predicting remaining probe equipment life in accordance with an embodiment of the invention.

In view of the foregoing, the peer based prediction system 100 performs the method of predicting remaining target equipment life. Referring now to FIG. 6, an embodiment of a generalized flowchart 600 of an exemplary method of predicting remaining target equipment life is depicted.

In an embodiment, the method begins with receiving 610 information regarding the operational behavior of the probe 210, identifying 620 from the database 170 at least one peer 221 having operational similarities to the probe 210, and retrieving 630 from the database 170 data prior to an end of the useful life of the peer 221, the data having a relationship to the behavior of the probe 210. The method further includes evaluating 640 the similarity of the relationship, predicting 650 the remaining life of the probe 210 based upon the similarity of the peer 221 and generating 660 the signal corresponding to the predicted remaining life of the probe 201. In an embodiment, the receiving information 610 includes receiving information 610 regarding the behavior of the turbine engine 110 as the probe 210.

An embodiment of the invention further includes applying the function to define the range for the attribute of the behavior. In an embodiment, the identifying 620 at least one peer 221 includes determining if the attribute of the operational data is within the defined range. In an embodiment, the function to define the range for the attribute of the behavior includes Equation-3.

$$TGBF_i(x_i; a_i, b_i, c_i) = \qquad \text{Equation-3}$$
$$\left\{ \begin{array}{ll} \left[1 + \left|\frac{x_i - c_i}{a_i}\right|^{2b_i}\right]^{-1} & \text{if} \left[1 + \left|\frac{x_i - c_i}{a_i}\right|^{2b_i}\right]^{-1} > \varepsilon \\ 0 & \text{otherwise} \end{array} \right\}$$

In an embodiment, the method further includes applying the function to define the similarity coefficient, $S_{i,j}$ of the attribute of the peer 221 data to the probe 210. In an embodiment, the evaluating the similarity of the relationship includes using the similarity coefficient $S_{i,j}$. In an embodiment, the function to define the similarity coefficient $S_{i,j}$ includes Equation-4.

$$S_{i,j} = TGBF(x_{i,j}; a_i, b_i, x_{i,Q}) = \left\{ \left[ 1 + \left| \frac{x_{i,Q} - x_{i,j}}{a_i} \right|^{2b_i} \right]^{-1} \right\} \quad \text{Equation-4}$$

In an embodiment, the method further includes defining the peer similarity coefficient, $S_j$ as the minimum of the plurality of similarity coefficients $S_{i,j}$. In an embodiment, defining the peer similarity coefficient, $S_j$ includes applying the weighting value to each similarity coefficient $S_{i,j}$ of the plurality of similarity coefficients $S_{i,j}$.

In an embodiment, the method further includes obtaining the local mathematical model of the remaining life estimate of the peer 221 from the database and applying the peer similarity coefficient $S_j$ to the local model to predict the remaining life of the probe 210. In an embodiment, the predicting 650 the remaining life of the probe 210 includes solving Equation-7.

$$y_Q = \frac{\sum_{j=1}^{m} S_j \times y_j}{\sum_{j=1}^{m} S_j} \quad \text{Equation-7}$$

An embodiment of the method also includes defining at least one of the weighting value, the width parameter, and the slope parameter with the evolutionary algorithm.

An embodiment of the method includes tuning and maintaining parameters of at least one of the identifying 620 at least one peer 222, the retrieving 630 data, and the evaluating 640 the similarity of the relationship via the optimization wrapper. In an embodiment, the tuning and maintaining parameters includes receiving historical data regarding the behavior of the peer equipment 221, encoding the parameters of the identifying 620, retrieving 630, and evaluating 640 for evolutionary algorithm, creating a performance metric for the predicting the remaining life of the probe 210, tuning the parameters using the optimization wrapper to optimize the performance metric and storing the tuned parameters for future use and additional tuning. In an embodiment, the creating the performance metric includes defining the prediction accuracy measured as the absolute value of the prediction error.

An embodiment of the invention may be embodied in the form of computer-implemented processes and apparatuses for practicing those processes. Embodiments of the invention may also be embodied in the form of a computer program product having computer program code containing instructions embodied in tangible media, such as floppy diskettes, punch cards, CD-ROMs, hard drives, universal serial bus drives, or any other computer readable storage medium, wherein, when the computer program code is loaded into and executed by a computer, the computer becomes an apparatus for practicing the invention. Embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to predict a remaining useful life of equipment based upon remaining useful life estimates of similar pieces of peer equipment.

As disclosed, some embodiments of the invention may include some of the following advantages: the ability to estimate remaining useful life of equipment based on aggregating RUL estimates from selected peers; the ability to estimate remaining useful life of equipment with system operational data in the absence of detailed materials-based models, run-to-end-of-equipment-useful-life data, maintenance data, and environmental data; the ability to tune parameters for the selection of peers based on system operational data; the ability to improve peer selection by segmenting the operational data by failure modes; the ability to dynamically tune the model parameters based upon updated operational data; and the ability to use on-line equipment assessment to modify control action appropriately.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method to predict remaining life of a target equipment, the method comprising:
   receiving target information regarding a behavior of the target equipment, said target information including at least a target operational history;
   identifying from a database at least one piece of peer equipment having similarities to the target equipment based upon said behavior of said target equipment;
   retrieving from the database peer data of said peer equipment having a relationship to the behavior of said target equipment, wherein said peer data includes at least peer operational data;
   evaluating a similarity of the relationship between the peer equipment and the target equipment using said peer data and said target information;
   creating at least one model based upon the similarity;
   predicting the remaining life of the target equipment based upon the models using an evolutionary search of said model for at least one iteration; and
   generating a signal corresponding to the predicted remaining life of the target equipment.

2. The method of claim 1, further comprising: using an evolutionary algorithm processing for of at least one of the identifying, retrieving, and evaluating.

3. The method of claim 2, wherein the evolutionary algorithm processing comprises:
encoding the parameters of at least one of the identifying, retrieving, and evaluating;
building a fuzzy model to output at least one predicted life estimation;
creating a performance metric to output at least one fitness function result; and
for each unit, comparing said fitness function result with the predicted life estimation to produce a predictive accuracy.

4. The method of claim 3, wherein the comparing comprises:
defining said prediction accuracy measured as an absolute value of a prediction error.

5. The method of claim 1, wherein the receiving target information comprises:
receiving target information regarding the behavior of a turbine engine as the target equipment.

6. The method of claim 1, further comprising:
applying a function to define a range for an attribute of the behavior;
wherein the identifying comprises determining if an attribute of the peer data is within the defined range.

7. The method of claim 6, wherein the applying comprises applying the function:

$$TGBF_i(x_i; a_i, b_i, c_i) = \begin{cases} \left[1 + \left|\frac{x_i - c_i}{a_i}\right|^{2b_i}\right]^{-1} & \text{if } \left[1 + \left|\frac{x_i - c_i}{a_i}\right|^{2b_i}\right]^{-1} > \varepsilon \\ 0 & \text{otherwise} \end{cases}$$

wherein:
$TGBF_i(x_i; a_i, b_i, c_i)$ represents the range;
$a_i$ represents a width parameter;
$b_i$ represents a slope parameter;
$c_i$ represents a value of the attribute of the observed behavior;
$\varepsilon$ represents a truncation parameter; and
$x_i$ represents a value of the attribute of the behavior.

8. The method of claim 1, further comprising:
applying a function to define a similarity coefficient, $S_{i,j}$ of an attribute of the peer data;
wherein the evaluating comprises using the similarity coefficient $S_{i,j}$.

9. The method of claim 8, wherein the applying comprises applying the function:

$$S_{i,j} = TGBF(x_{i,j}; a_i, b_i, x_{i,Q}) = \left\{\left[1 + \left|\frac{x_{i,Q} - x_{i,j}}{a_i}\right|^{2b_i}\right]^{-1}\right\}$$

wherein:
$S_{i,j} = TGBF(x_{i,j}; a_i, b_i, x_{i,Q})$ represents the similarity coefficient;
$a_i$ represents a width parameter;
$b_i$ represents a slope parameter;
$x_{i,Q}$ represents a value of an attribute of the behavior; and
$x_{i,j}$ represents a value of the attribute of the operational data of the peer equipment.

10. The method of claim 9, wherein the peer data comprises a plurality of attributes, each attribute having the similarity coefficient $S_{i,j}$, the method further comprising:
defining an equipment similarity coefficient, $S_j$ as a minimum of the plurality of similarity coefficients $S_{i,j}$.

11. The method of claim 10, wherein the defining the equipment similarity coefficient $S_j$ comprises:
applying a weighting value to each similarity coefficient $S_{i,j}$ of the plurality of similarity coefficients $S_{i,j}$.

12. The method of claim 11, further comprising:
defining at least one of the weighting value, the width parameter, and the slope parameter with an evolutionary algorithm.

13. The method of claim 10, wherein the predicting comprises:
obtaining a mathematical model of a remaining life estimate of the peer equipment; and
applying the equipment similarity coefficient $S_j$ to the model to predict the remaining life of the target equipment.

14. The method of claim 13, wherein the predicting comprises solving an equation:

$$y_Q = \frac{\sum_{j=1}^{m} S_j \times y_j}{\sum_{j=1}^{m} S_j}$$

wherein:
$y_Q$ represents the predicted remaining life of the target equipment;
j represents an index relating to the peer equipment;
m represents a total number of peer equipment included;
$S_j$ represents the equipment similarity coefficient; and
$y_j$ represents the remaining life estimate of the peer equipment.

15. A program storage device readable by a computer, the device embodying a program or instructions executable by the computer to perform the method of claim 1.

16. A system to predict remaining useful life of a target equipment, the system comprising:
a database comprising peer data for at least one peer equipment and target data for said target equipment;
a processor in signal communication with the database;
a computational model application for executing on the processor, the computational model performing a method, comprising:
receiving information regarding a behavior of the target equipment, said behavior including at least operational history;
identifying from the database at least one piece of peer equipment having similarities to the target equipment;
retrieving from the database peer data having a relationship to the behavior;
evaluating a similarity of the relationship;
creating at least one model based upon the similarity; and
predicting the remaining useful life of the target equipment based upon the similarity using an evolutionary search of said model for at least one iteration;
wherein the processor is responsive to the computational model application to generate a signal corresponding to the predicted remaining useful life.

17. The system of claim 16, wherein the computational model application further performs:
using an evolutionary algorithm processing for at least one of the identifying, retrieving, and evaluating.

18. The system of claim 17, wherein the evolutionary algorithm processing comprises;
encoding the parameters of at least one of the identifying, retrieving, and evaluating;

building a fuzzy model to output at least one predicted life estimation;

creating a performance metric to output at least one fitness function result; and for each unit, comparing said fitness function result with the predicted life estimation to produce a predictive accuracy.

19. The system of claim 18, wherein the computational model application performs creating the performance metric, the creating the performance metric comprising:

defining said prediction accuracy measured as an absolute value of a prediction error.

20. The system of claim 16, wherein:

the target equipment comprises a turbine engine.

21. The system of claim 16, wherein the computational model application further performs:

applying a function to define a range for an attribute of the behavior;

wherein the identifying comprises determining if an attribute of the peer data is within the defined range.

22. The system of claim 21, wherein the applying the function by the computational model application comprises applying the function:

$$TGBF_i(x_i; a_i, b_i, c_i) = \left\{ \begin{array}{ll} \left[1 + \left|\frac{x_i - c_i}{a_i}\right|^{2b_i}\right]^{-1} & \text{if } \left[1 + \left|\frac{x_i - c_i}{a_i}\right|^{2b_i}\right]^{-1} > \varepsilon \\ 0 & \text{otherwise} \end{array} \right\}$$

wherein:

$TGBF(x_i; a_i, b_i, c_i)$ represents the range;

$a_i$ represents a width parameter;

$b_i$ represents a slope parameter;

$c_i$ represents a value of the attribute of the observed behavior;

$\varepsilon$ represents a truncation parameter; and $x_i$ represents a value of the attribute of the behavior.

23. The system of claim 16, wherein the computational model application further performs:

applying a function to define a similarity coefficient, $S_{i,j}$ of an attribute of the peer data;

wherein the evaluating comprises using the similarity coefficient $S_{i,j}$.

24. The system of claim 23, wherein the applying the function by the computational model application comprises applying the function:

$$S_{i,j} = TGBF(x_{i,j}; a_i, b_i, x_{i,Q}) = \left\{ \left[1 + \left|\frac{x_{i,Q} - x_{i,j}}{a_i}\right|^{2b_i}\right]^{-1} \right\}$$

wherein:

$S_{i,j}$, $TGBF(x_{i,j}; a_i, b_i, x_{i,Q})$ represents the similarity coefficient;

$a_i$ represents a width parameter;

$b_i$ represents a slope parameter;

$x_{i,Q}$ represents a value of an attribute of the behavior; and $x_{i,j}$ represents a value of the attribute of the peer data.

25. The system of claim 23, wherein the peer data comprises a plurality of attributes, each attribute having the similarity coefficient $S_{i,j}$, wherein the computational model application further performs:

defining an equipment similarity coefficient, $S_j$ as a minimum of the plurality of similarity coefficients $S_{i,j}$.

26. The system of claim 25, wherein the computational model application performs defining an equipment similarity coefficient $S_j$, the defining comprising:

applying a weighting value to each similarity coefficient $S_{i,j}$ of the plurality of similarity coefficients $S_{i,j}$.

27. The system of claim 25, wherein the predicting by the computational model application comprises:

obtaining a mathematical model of a remaining life estimate of the peer equipment; and applying the equipment similarity coefficient $S_j$ to the model to predict the remaining life of the target equipment.

28. The system of claim 27, wherein the predicting by the computational model application comprises solving an equation:

$$y_Q = \frac{\sum_{j=1}^{m} S_j \times y_j}{\sum_{j=1}^{m} S_j}$$

wherein:

$y_Q$ represents the predicted remaining life of the target equipment;

j represents an index relating to the peer equipment;

m represents a total number of peer equipment included;

$S_j$ represents the equipment similarity coefficient; and $y_j$ represents the remaining life estimate of the peer equipment.

* * * * *

UNITED STATES PATENT AND TRADEMARK OFFICE
CERTIFICATE OF CORRECTION

PATENT NO. : 7,725,293 B2
APPLICATION NO. : 11/608058
DATED : May 25, 2010
INVENTOR(S) : Bonissone et al.

Page 1 of 2

It is certified that error appears in the above-identified patent and that said Letters Patent is hereby corrected as shown below:

In Column 1, Line 33, delete ""lifting"." and insert -- "lifing". --, therefor.

In Column 6, Lines 15-16, in Equation 3, delete "$\begin{cases} \left[1+\left|\frac{x_i-c_i}{a_i}\right|^{2b_i}\right]^{-1} \\ 0 \end{cases}$" and insert -- $\begin{cases} \left[1+\left|\frac{x_i-c_i}{a_i}\right|^{2b_i}\right]^{-1} \\ 0 \end{cases}$ --, therefor.

In Column 7, Lines 21-22, in Equation 4, delete "$\left[\phantom{x}\right]^{2b_2}$" and insert -- $\left[\phantom{x}\right]^{2b_i}$ --, therefor.

In Column 8, Line 60, in Equation 8, delete "[w₁ w₂" and insert -- [w₁, w₂ --, therefor.

In Column 10, Lines 56-58, in Equation 3, delete "$\begin{cases} \left[1+\left|\frac{x_i-c_i}{a_i}\right|^{2b_i}\right]^{-1} \\ 0 \end{cases}$" and insert -- $\begin{cases} \left[1+\left|\frac{x_i-c_i}{a_i}\right|^{2b_i}\right]^{-1} \\ 0 \end{cases}$ --, therefor.

In Column 13, Lines 28-31, in Claim 7, delete "$\begin{cases} \left[1+\left|\frac{x_i-c_i}{a_i}\right|^{2b_i}\right]^{-1} \\ 0 \end{cases}$" and insert Signed and Sealed this
Seventh Day of February, 2012

David J. Kappos
*Director of the United States Patent and Trademark Office*

CERTIFICATE OF CORRECTION (continued)
U.S. Pat. No. 7,725,293 B2

-- $\left\{ \begin{matrix} \left[ 1 + \left| \frac{x_i - c_i}{a_i} \right|^{2b_i} \right]^{-1} \\ 0 \end{matrix} \right.$ --, therefor.

In Column 15, Lines 28-30, in Claim 22, delete " $TGBF_i(x_i; a_i, b_i, c_i) = \left\{ \begin{matrix} \left[ 1 + \left| \frac{x_i - c_i}{a_i} \right|^{2b_i} \right]^{-1} \\ 0 \end{matrix} \right.$ " and insert -- $TGBF(x_i; a_i, b_i, c_i) = \left\{ \begin{matrix} \left[ 1 + \left| \frac{x_i - c_i}{a_i} \right|^{2b_i} \right]^{-1} \\ 0 \end{matrix} \right.$ --, therefor.